(12) United States Patent
Vasseur et al.

(10) Patent No.: US 10,218,726 B2
(45) Date of Patent: Feb. 26, 2019

(54) DYNAMIC DEVICE CLUSTERING USING DEVICE PROFILE INFORMATION

(71) Applicant: Cisco Technology, Inc., San Jose, CA (US)

(72) Inventors: Jean-Philippe Vasseur, Anchorage, AK (US); Grégory Mermoud, Veyras (CH); Pierre-André Savalle, Rueil-Malmaison (FR); Andrea Di Pietro, Lausanne (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 15/180,540

(22) Filed: Jun. 13, 2016

(65) Prior Publication Data

US 2017/0279829 A1    Sep. 28, 2017

Related U.S. Application Data

(60) Provisional application No. 62/313,537, filed on Mar. 25, 2016.

(51) Int. Cl.
*H04L 29/06* (2006.01)
*H04L 12/24* (2006.01)
*H04L 29/08* (2006.01)
*G06N 99/00* (2019.01)

(52) U.S. Cl.
CPC ....... *H04L 63/1425* (2013.01); *G06N 99/005* (2013.01); *H04L 41/0893* (2013.01); *H04L 63/0236* (2013.01); *H04L 63/1458* (2013.01); *H04L 63/20* (2013.01); *H04L 67/303* (2013.01); *H04L 2463/142* (2013.01); *H04L 2463/144* (2013.01)

(58) Field of Classification Search
CPC .......................... H04L 63/1425; G06N 99/005
USPC ..................................................... 726/22–25
See application file for complete search history.

(56) References Cited

U.S. PATENT DOCUMENTS

| 7,500,266 | B1 | 3/2009 | Vukelich et al. |
| 7,865,203 | B2 | 1/2011 | Lei et al. |
| 7,961,645 | B2 | 6/2011 | Gudipudi et al. |

(Continued)

FOREIGN PATENT DOCUMENTS

| CN | 101877820 A | 11/2010 |
| CN | 102760138 A | 10/2012 |
| CN | 104883278 A | 9/2015 |

OTHER PUBLICATIONS

European Search Report dated Aug. 1, 2017 in connection with European Application No. 17 16 2410.

*Primary Examiner* — Anthony D Brown
(74) *Attorney, Agent, or Firm* — Parker Ibrahim & Berg LLP; James M. Behmke; Stephen D. LeBarron

(57) ABSTRACT

In one embodiment, a networking device in a network causes formation of device clusters of devices in the network. The devices in a particular cluster exhibit similar characteristics. The networking device receives feedback from a device identity service regarding the device clusters. The feedback is based in part on the device identity service probing the devices. The networking device adjusts the device clusters based on the feedback from the device identity service. The networking device performs anomaly detection in the network using the adjusted device clusters.

20 Claims, 14 Drawing Sheets

(56) References Cited

U.S. PATENT DOCUMENTS

| | | |
|---|---|---|
| 7,975,035 B2 | 7/2011 | Popescu et al. |
| 9,060,018 B1 | 6/2015 | Yu et al. |
| 2011/0082824 A1 | 4/2011 | Allison et al. |
| 2015/0039513 A1 | 2/2015 | Adjaoute |
| 2015/0101053 A1* | 4/2015 | Sipple ................. H04L 63/1425 726/24 |

* cited by examiner

DYNAMIC DEVICE CLUSTERING USING DEVICE PROFILE INFORMATION

RELATED APPLICATIONS

This application claims priority to U.S. Provisional Application No. 62/313,537, filed Mar. 25, 2016, entitled "SELF ORGANIZING LEARNING TOPOLOGIES," by Vasseur et al., the contents of which are hereby incorporated by reference.

TECHNICAL FIELD

The present disclosure relates generally to computer networks, and, more particularly, to performing dynamic device clustering using device profile information from a device identity service.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signature. Observing behavioral changes (e.g., deviation from modeled behavior) using flows records, deep packet inspection, and the like, allows for the detection of an anomaly such as a horizontal movement (e.g. propagation of a malware, . . . ) or an attempt to perform information exfiltration, prompting the system to take remediation actions automatically.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
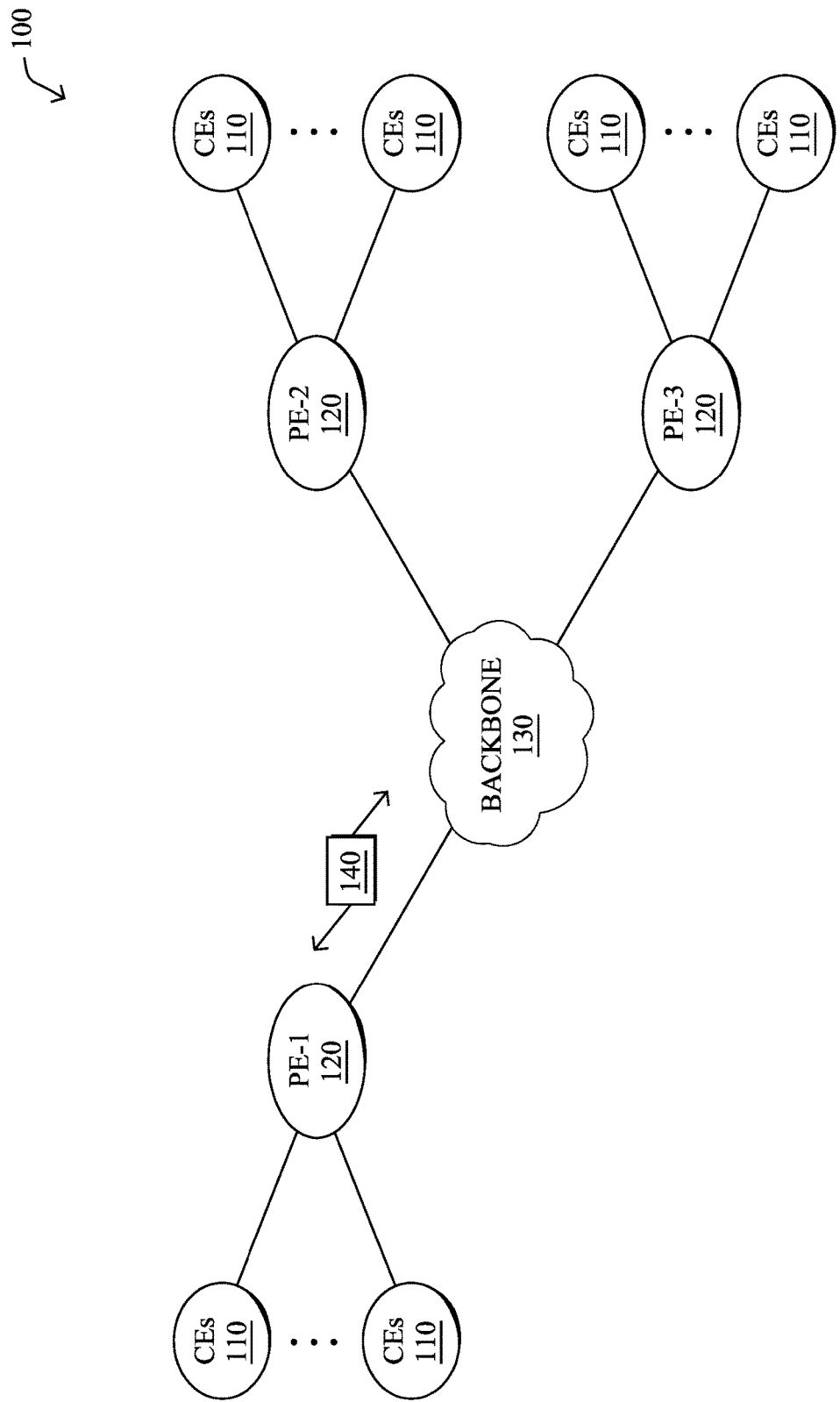
FIGS. 1A-1B illustrate an example communication network.

According to one or more embodiments of the disclosure, a networking device in a network causes formation of device clusters of devices in the network. The devices in a particular cluster exhibit similar characteristics. The networking device receives feedback from a device identity service regarding the device clusters. The feedback is based in part on the device identity service probing the devices. The networking device adjusts the device clusters based on the feedback from the device identity service. The networking device performs anomaly detection in the network using the adjusted device clusters.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
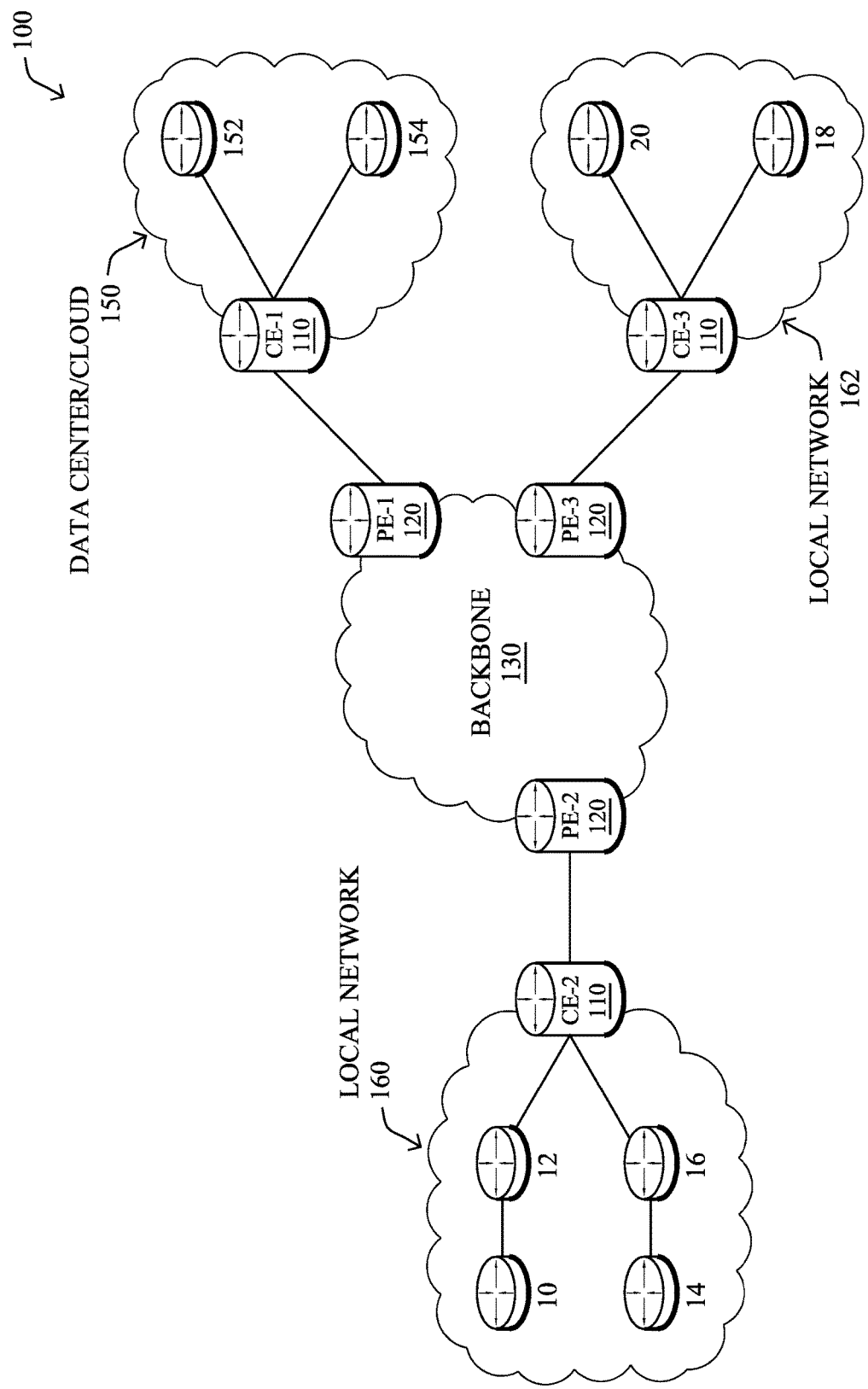

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
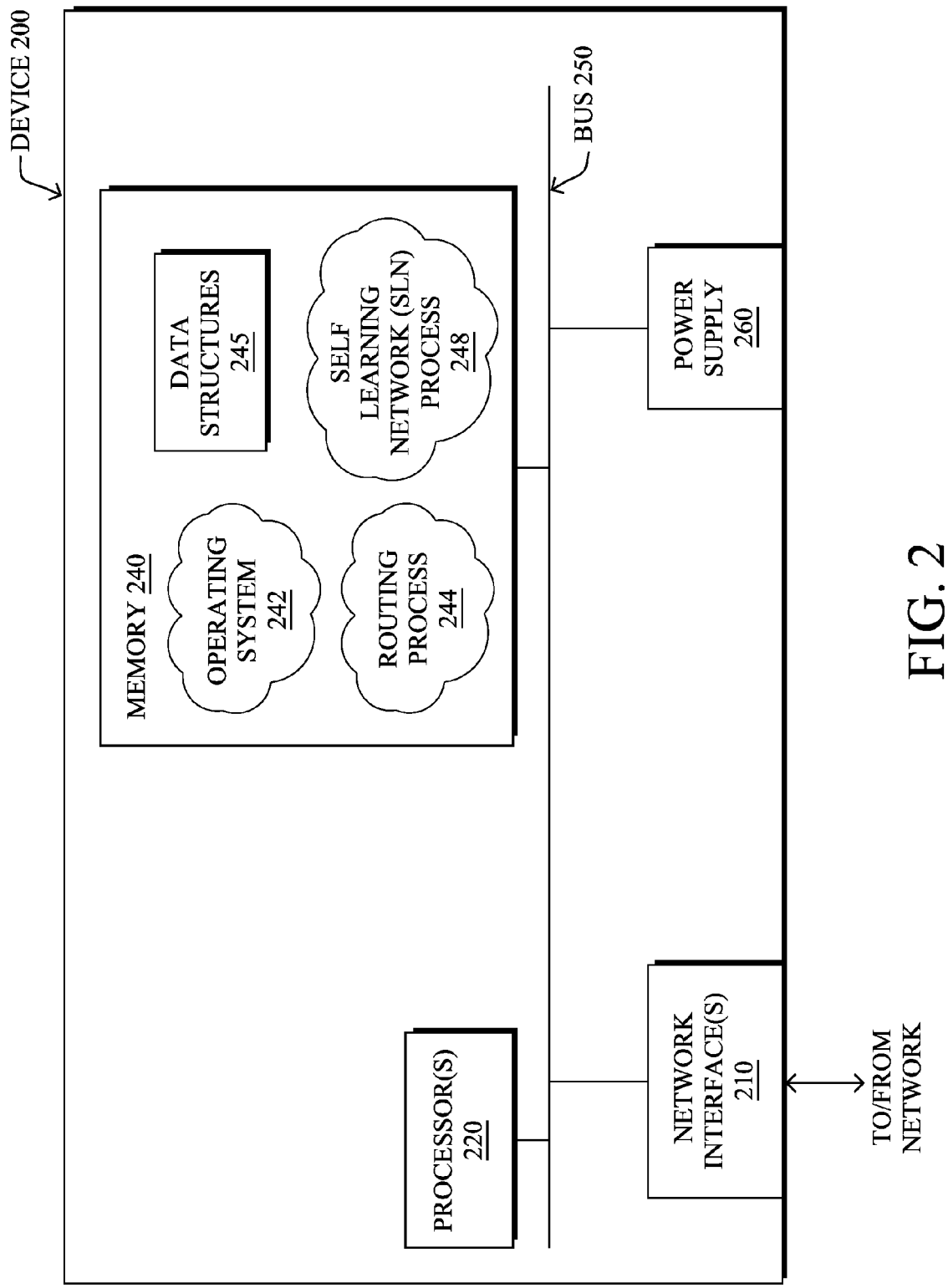
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space.

Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
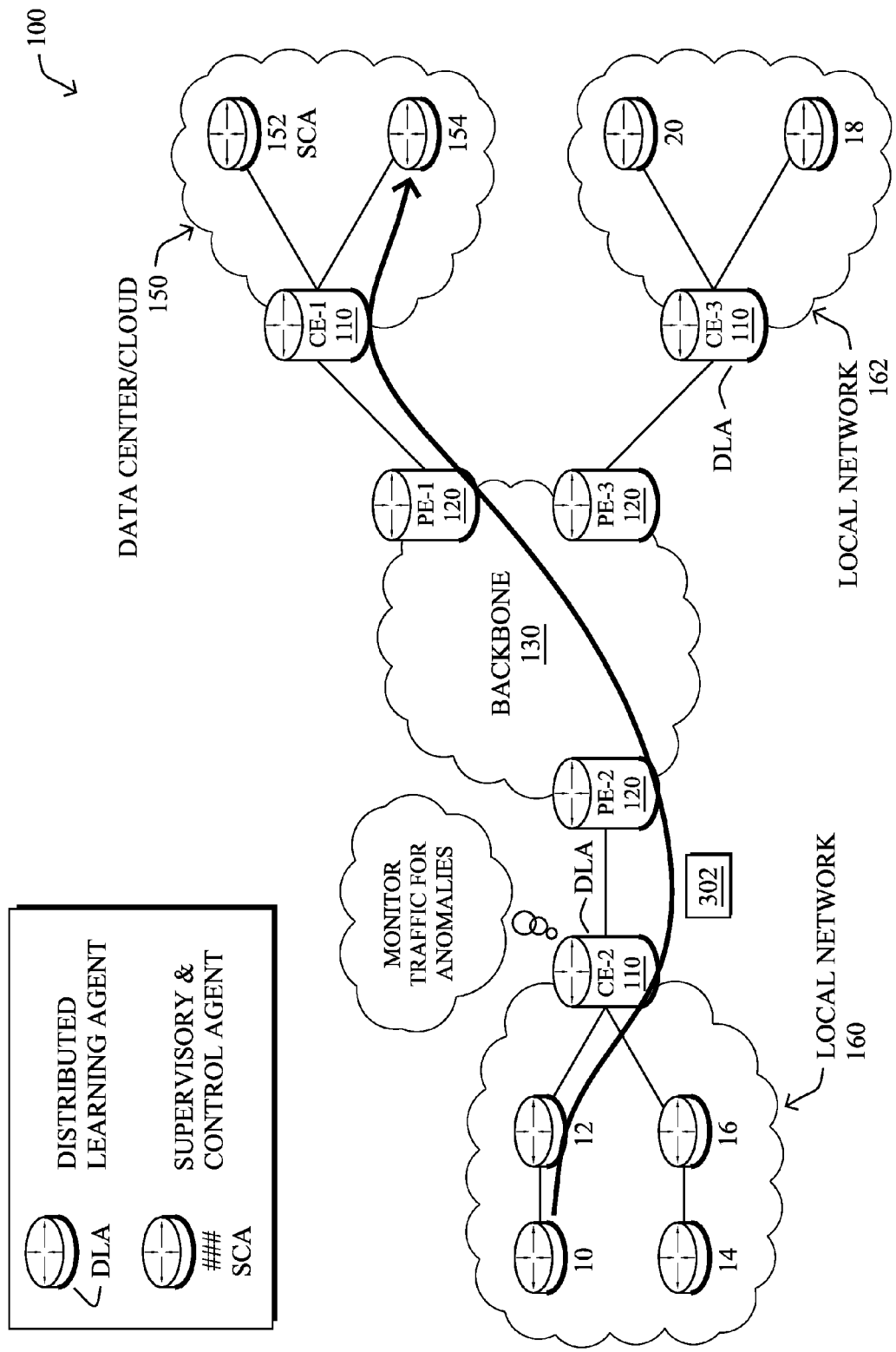
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
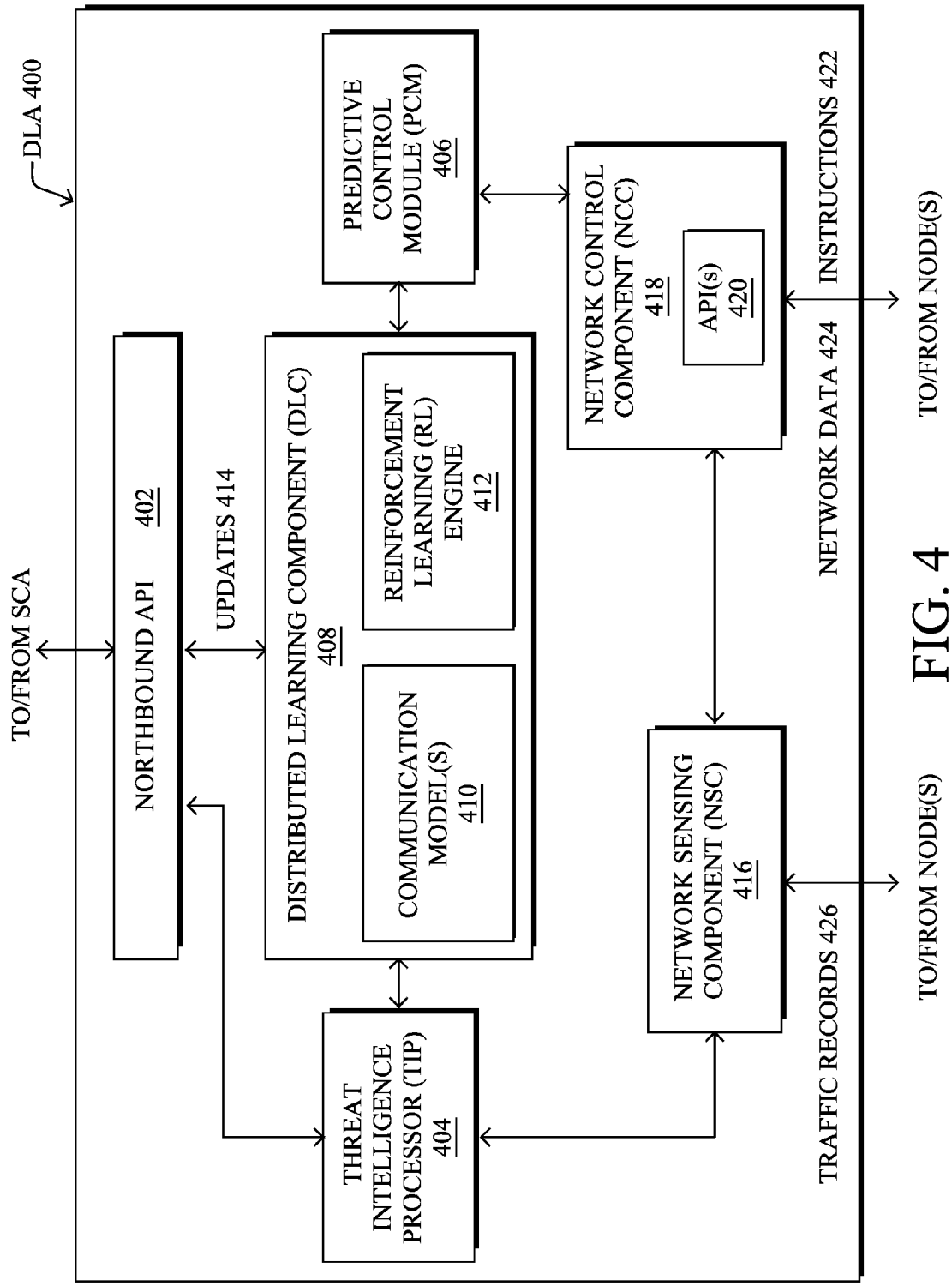
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, contextual information is critical for a DLA to properly model device behaviors at the edge of a network. In various embodiments, the DLA may be configured to analyze the behaviors of devices as part of various sets of device "clusters." In particular, the SLN may group the various nodes/devices in the network based on their characteristics/behaviors. For example, nodes that have the same or similar configurations (e.g., operating systems, hardware, etc.), applications, traffic patterns, etc., may be identified for inclusion in a particular device cluster. In turn, the DLA may compare the behaviors of the cluster members, to identify behavioral anomalies (e.g., if the behavior of a particular cluster member is an outlier compared to the other members). Further, the DLA may also model the interactions (e.g., traffic, etc.) between device clusters, to perform behavioral analysis.

While device clustering can enhance the behavioral analytics by a DLA, it still remains challenging to capture the relevant device profile information used to form the clusters. In particular, if the DLA relies solely on information directly available on the DLA (e.g., application breakdowns, etc.), this information can be inaccurate, thus leading to improper cluster assignments. In turn, improper cluster assignments can lead to weaker model performance. For example, if devices A and B have very different natures, but are included in the same cluster because they have similar application breakdowns, both devices will share common models but should have different models. Such a lack of contextual information does not allow for the proper classification of devices, in order to model their behaviors.

Dynamic Clustering at the Edge Using Device Profile Information

The techniques herein provide for a device profiling mechanism that entails a device identity service (DIS) sending device profile information to remote learning agents that qualify for dynamic clustering at the network edge. In some aspects, when bandwidth/memory/CPU are scarce resources on the remote learning agent, clustering is performed in parallel at edge and on a DIS, according to a different set of criteria. The devices may also dynamically exchange the lists of cluster memberships, to determine discrepancies that may lead to poor classification and consequently incorrect modeling. The system may address such discrepancies by overriding clustering decisions, or request on the fly, by the DLA using additional information from the DIS, to adjust the clustering. Models to detect clustering discrepancy may be used to improve DLA's clustering strategy. Another aspect allows for the detection of a misclassified host and to push proper clustering outputs proactively from a central component using accurate clustering thanks to the DIS and any number of DLAs.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, according to various embodiments, a networking device in a network causes formation of device clusters of devices in the network. The devices in a particular cluster exhibit similar characteristics. The networking device receives feedback from a device identity service regarding the device clusters. The feedback is based in part on the device identity service probing the devices. The networking device adjusts the device clusters based on the feedback from the device identity service. The networking device performs anomaly detection in the network using the adjusted device clusters.

Figure 5:
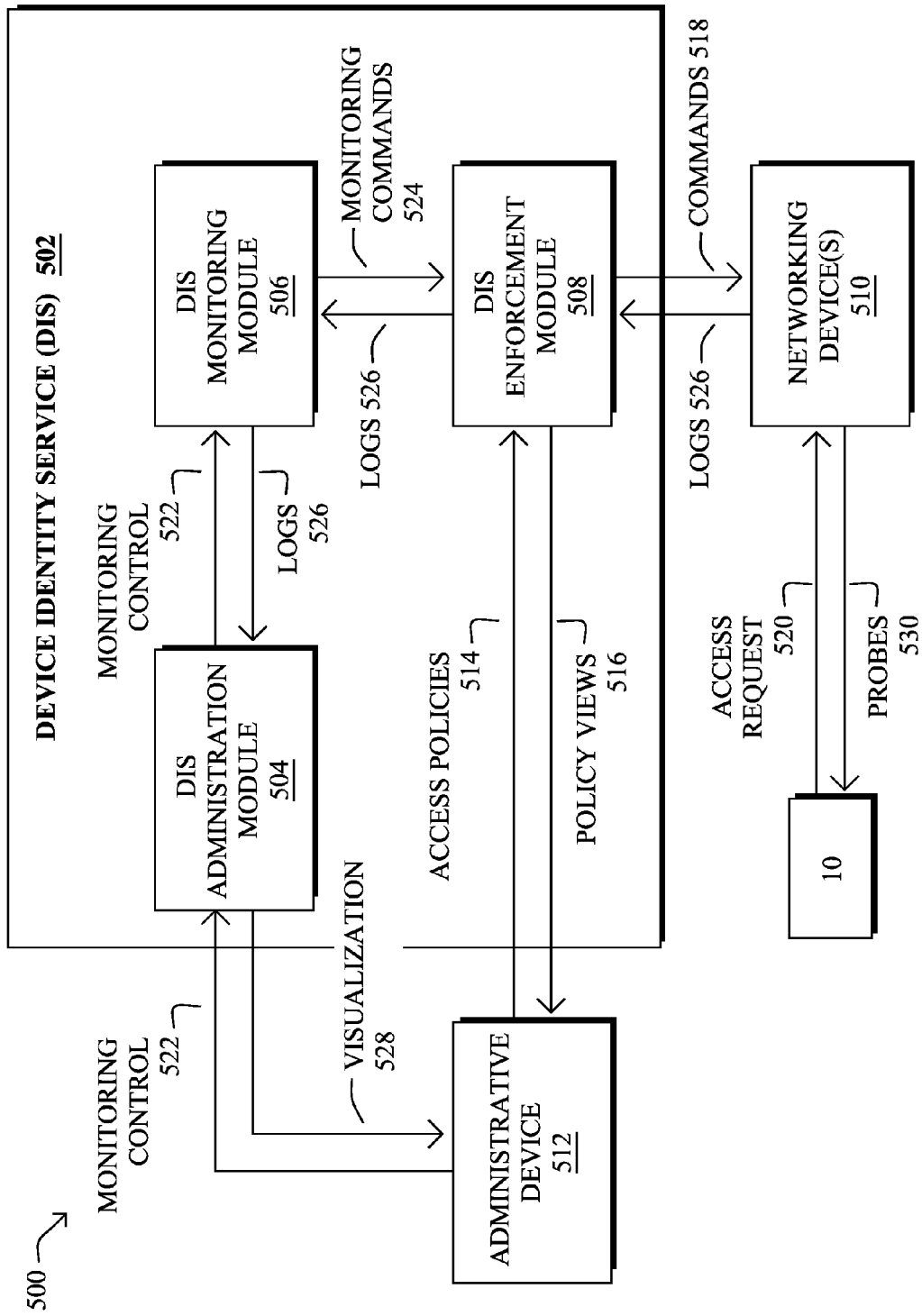
FIG. 5 illustrates an example architecture for a device identity service (DIS)

Operationally, in various embodiments, a device identity service (DIS) supports the advanced function of device profiling, which can be used to discover, identify devices on the network and also determine the device capabilities. FIG. 5 illustrates an example architecture 500 for a device identity service (DIS) 502, according to various embodiments. Generally, a DIS refers to a service/engine that is configured to identify nodes/devices in a network. An example of a DIS is the Identity Services Engine (ISE) by Cisco Systems™, among others identity engines. In many cases, such a service operates as part of a network admission control mechanism, to control which devices are allowed to join the network and the operations an admitted device can perform while on the network.

As shown, DIS 502 may include three primary modules: a DIS administration module 504, a DIS monitoring module 506, and a DIS enforcement module 508. In various embodiments, modules 504-508 may be hosted on a single networking device or, alternatively, distributed across different devices. An administrative device 512 may interact with DIS 502 to control the access control functions of DIS 502 (e.g., by specifying access control policies 514) and/or to specify monitoring control policies 522 that control how DIS 502 gathers information about the nodes/devices in the network. In addition, DIS 502 may send visualizations 528 regarding the nodes/devices in the network to administrative device 512, as well as administrative policy views 516, back to administrative device 512 for presentation to the user.

DIS enforcement module 508 is responsible for the application of access policies 514 on the various networking devices 510 in the network. In particular, DIS enforcement module 508 may interface with networking devices 516 to send access control commands 518 to networking devices 510, based on access policies 514. In turn, networking devices 510 may use commands 518 to control network access/admission and restrict access to certain network resources. For example, assume that node 10 sends an access request 520 to a particular networking device 510, such as a wireless router, wireless access point, etc. In turn, the networking device 510 may restrict the access of node 10 to the network (e.g., by preventing node 10 from joining the network) and/or to restrict the access of node 10 to certain resources of the network (e.g., by allowing node 10 to perform only certain actions in the network).

In addition to admission and access control functions, DIS 502 may also perform a number of monitoring operations, to gather device profile information about the various nodes/devices in the network. In particular, DIS monitoring module 506 may convert monitoring control policies 522 from the administrator into monitoring commands 524 that are then passed by DIS enforcement module 508 to networking devices 510 as part of commands 518.

In some embodiments, networking devices 510 may use a variety of probes 530, to gather device profile information regarding node/device 10. For example, probes 530 may include DHCP probes with helper addresses, SPAN probes to get messages in INIT-REBOOT and SELECTING states, Netflow records, HTTP probes to retrieve information such as the operating system of node 10 and/or web browser information, RADIUS probes, SNMP probes to retrieve MIB object or receive traps, DNS probes to get the Fully Qualified Domain Name (FQDN), or other probes to gather other information regarding node 10. Networking devices 510 may also use an ARP cache for IP/MAC binding, in some cases. DIS 502 may even trigger active scanning of the network and SNMP scanning when the default community string is set to public (e.g., to retrieve the MAC address or other types of information). Such a variety of probes allows DIS 502 to gather a rich set of information and perform accurate device profiling.

DIS monitoring module 506 may also collect and aggregate logs 526 generated as a result of probes 530 and other device profile collection actions performed by networking devices 510. In turn, DIS administration module 504 may covert the gathered device profile information into visualizations 528 for review by the administrator. In some cases, DIS administration module 504 may even assign a certainty factor that quantifies the degree of confidence in the device profiling mechanism.

Figure 6A:
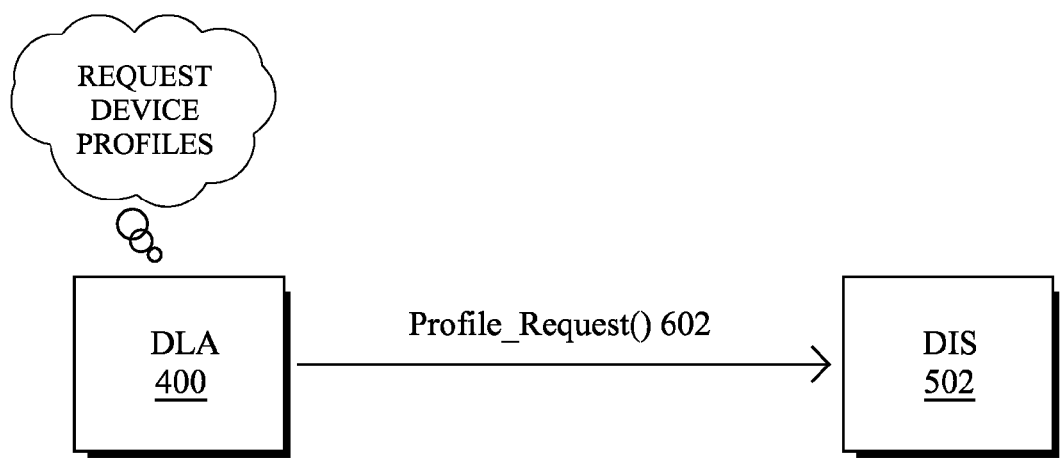
FIG. 6A-6C illustrates the formation of device clusters using device profile information from a DIS.
Figure 6B:
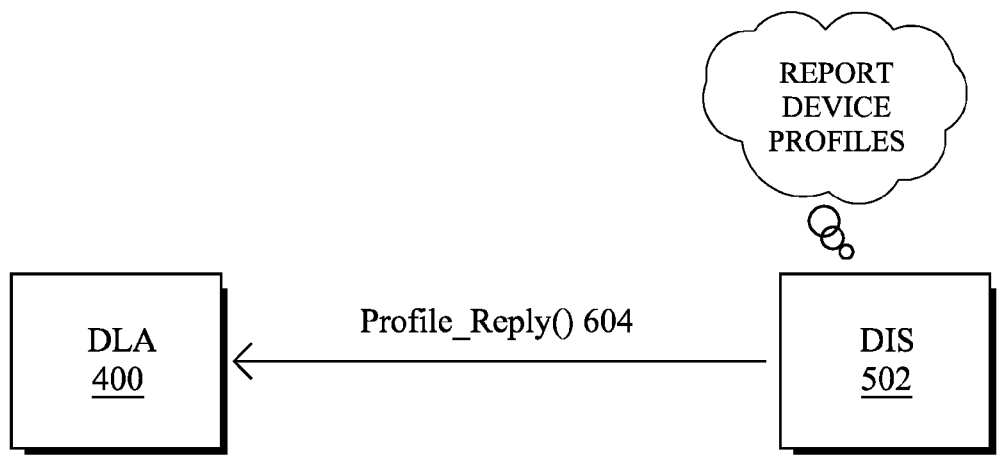
Figure 6C:

FIG. 6A-6C illustrates the formation of device clusters using device profile information from a DIS, according to various embodiments. One aspect of the techniques herein relates to the gathering of local information on the DLA, such as the list of hosts qualifying for behavioral analysis. For example, devices that are transient in the network (e.g., mobile devices, etc.) may not qualify for such an analysis. As shown in FIG. 6A, for example, DLA 400 may send a profile_request( ) message 602 to DIS 502, to request device profile information for one or more nodes/devices in the network.

In some embodiments, DLA 400 may use a DIS profile request policy, to control the profile requests sent by DLA 400 to DIS 502. Such policy considerations may include, but are not limited to, any or all of the following:
- The amount of time since the device has been seen
- The activity of the node/device (set of applications/protocols being used, . . . )
- The anomaly scores of anomalies that involve the node/device
- The stability of local profiling on the DLA (e.g., hosts that do not change cluster too often)
- The stability of previous DIS profiling information For example, DLA 400 may only request from DIS 502 accurate device profiling information for a node/device that has been seen N times over the past P hours, if the node uses HTTP and Cloud traffic and the node has been involved in anomalies with a given (or higher) anomaly score. In addition to this, the DLA may send profile requests less frequently for nodes/devices that are very stable (e.g., in terms of either the DIS accurate profiling or the local profiling by the DLA) than for devices that are dynamic and change frequently.

The proposed approach entails the DLA sending a list of hosts to the DIS as part of a profile_request( ) message 602. For each device cluster, the DLA may prune devices in a cluster based on the criteria of the profile request policy and only request device profiles for those devices matching the criteria. Message 602 may identify specific host nodes/devices by their IP addresses, MAC address, or both, in various cases. Optionally, profile_request( ) 602 may also request specific device attributes of interest to the DLA, such as the device type, name, statistical information, authentication attributes, etc.

Another aspect of the techniques herein specifies the communication channel between the DLA and the DIS. In deployment scenarios where the DLA is connected to the central controller via a high-speed link (such as in a campus), the DLA may simply triggers a tunnel to the controller/DIS. For example DLA 400 may establish a tunnel with DIS 502 using an approach such as PxGrid, to gather the requested device profiles of interest.

As shown in FIG. 6B, in response to receiving profile-request( ) message 602, DIS 502 may reply with a profile_reply( ) message 604 that includes the list of known device profiles for each requested device. DIS 502 may only provide the list of attributes of interest or, optionally, all attributes known if explicitly requested in the request message 602. Note that the requester/DLA usually does not know which profile attributes have been determined by the DIS. Furthermore, such attributes may vary with time as new attributes are discovered thanks, e.g., to dynamic, active, and passive probing, as described above.

As shown in FIG. 6C, DLA 400 may use the locally-obtained device information and the device profile information from the DIS, to form device clusters. For example, if certain nodes/devices exhibit similar characteristics in terms of behavior, traffic, configurations, etc., DLA 400 may group these nodes together into a single device cluster for purposes of behavioral analysis.

Figure 7A:
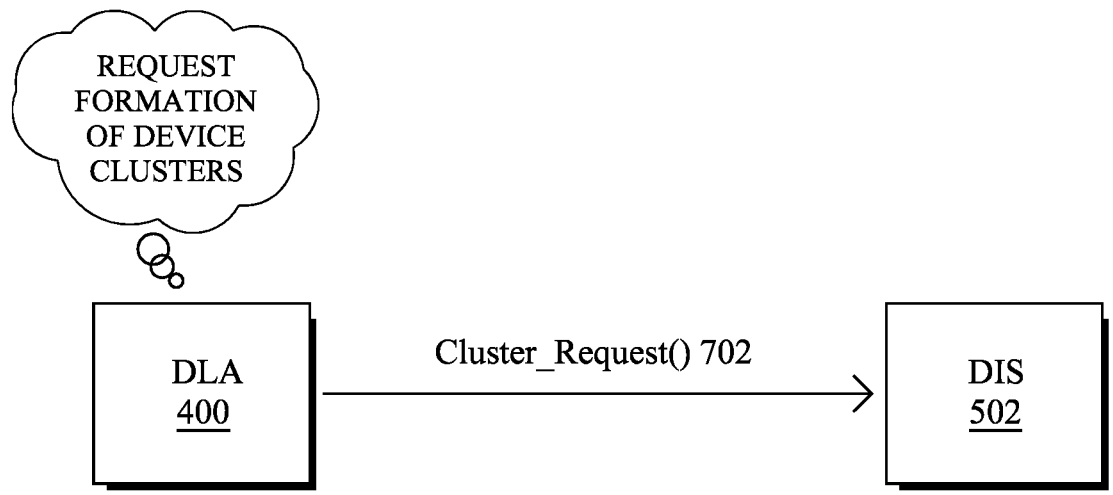
FIGS. 7A-7B illustrate the formation of device clusters by a DIS.
Figure 7B:
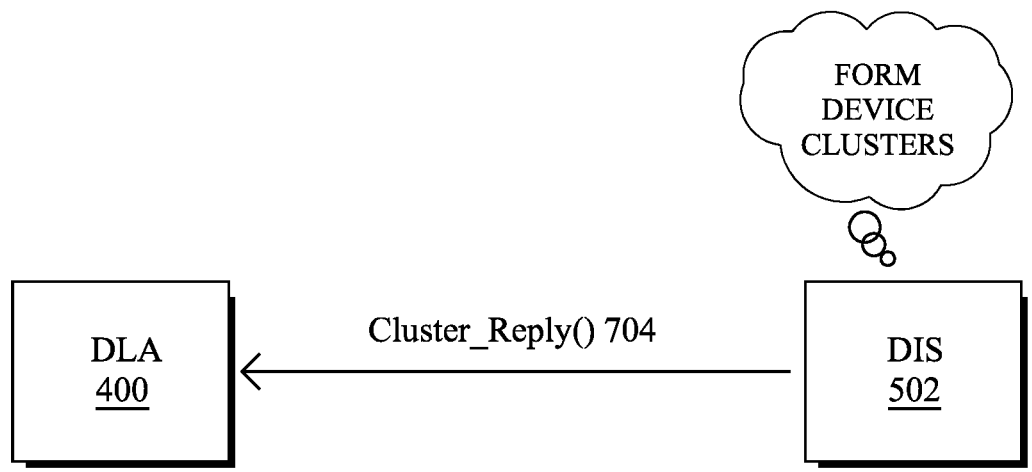

FIGS. 7A-7B illustrate the formation of device clusters by a DIS, according to various embodiments. In many cases, bandwidth constraints in the network and/or local DLA resources in terms of processing and memory storage may make the above approach unsuitable. Notably, retrieving device profiles from a DIS can be quite costly to process and will increase traffic in the network. Thus, in further embodiments, the DLA may not request device profile information from the DIS and another device in the network may perform the clustering instead, according to criteria known to both the DLA and the clustering device. For example, the device hosting the DIS, or another device in communication therewith, may instead leverage the device profiles from the DIS to form the device clusters. In further embodiments, the DLA and the other clustering device may form device clusters in parallel, using the device information available to the respective devices.

As shown in FIG. 7A, DLA 400 may send a custom cluster_request( ) message 702 to DIS 502, to request that DIS 502 perform device clustering. In some embodiments, message 702 may include information regarding the device clustered computed locally by DLA 400, such as the list of member hosts and cluster ID. Cluster_request( ) message 702 may also use compression, to further compress the data (e.g., using a Bloom filter, etc.). For example, message 702 may have the form of a set of lists with a local cluster ID: <C1, host-1, host-2, host-3>, <C2, host-10, host-15>, where C1 is the cluster computed using a potentially different set of criteria than used by DIS 502 to form clusters (e.g., DLA 400 may form the reported cluster based on an observed application breakdown).

As shown in FIG. 7B, in response to receiving cluster_request( ) message 702 with information regarding the clusters formed by DLA 400, DIS 502 may compute its own clusters, after retrieving the full list of profiles for the hosts identified in the list provided by DLA 400, using its own criteria which is not otherwise available to DLA 400. In turn, DIS 502 may provide a second list of device cluster information to DLA 400 via a cluster_reply( ) message 704. At this point, DLA 400 is able to compare both clusters using its local criteria based on behavioral analytics and the criteria used by DIS 502 based on the device clusters <C1': host-1, host-2>, <C2': host-10, host-3> and <C3': host-15>.

According to policy, DLA 400 may address any cluster discrepancies by overriding local decisions (e.g., by deferring to the DIS-computed clusters) or by sending a second profile_request( ) message 602 to DIS 502, to retrieve device profiles for the hosts that are potentially subject to misclassification (e.g., host-3 and host-15 in the example above). The process of exchanging clustering outputs between DLA 400 and DIS 502 may be triggered opportunistically, for example, when the DLA 400 detects a significant change in its clusters. DLA 400 may also employ any number of policies to determine when to send a device profile request to DIS 502, as described above.

In some embodiments, both DLA 400 and DIS 502 might use the same structured representation for clusters. This may come in the form of a tree structure, as in the topology mechanism described above, where the clusters can be represented as a standardized sequence of tokens. In this case, upon detecting a discrepancy, DLA 400 may compute the formal difference between the local cluster representation and that produced using DIS-supplied device profiles, by comparing which tokens do match, and which tokens do not match.

Figure 8A:
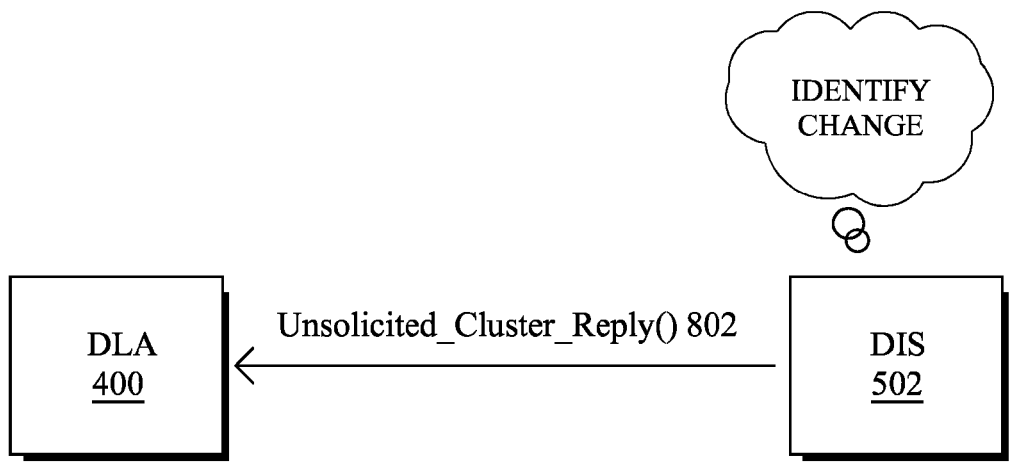
FIGS. 8A-8B illustrate a DIS providing feedback to a clustering mechanism.
Figure 8B:
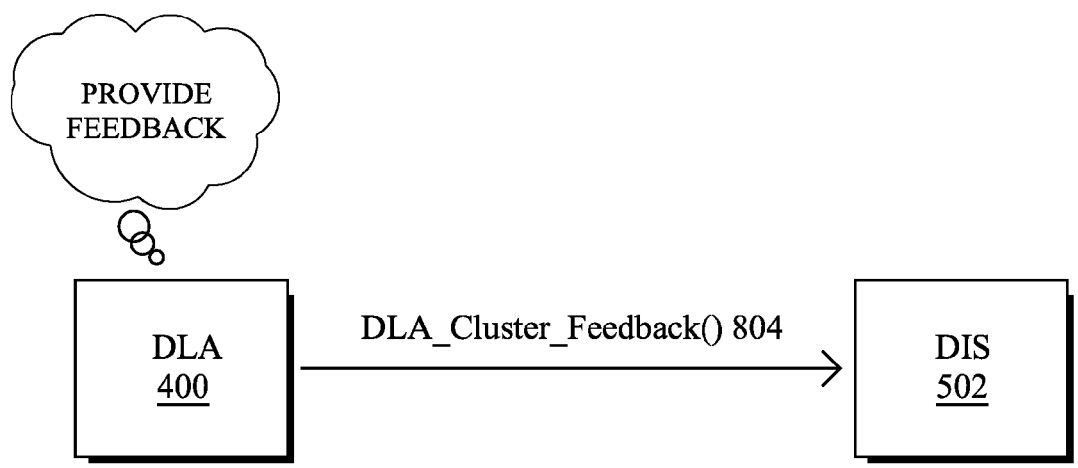

FIGS. 8A-8B illustrate a DIS providing feedback to a clustering mechanism, according to various embodiments. In some embodiments, DLA 400 may adjust its clustering strategy using feedback from DIS 502. Indeed, it may happen that DLA 400 is somehow biased, thus causing DLA 400 to make the same mistakes repeatedly. In one embodiment, DLA 400 uses structured prediction models, such as regression models where both input and output are tree structures in order the learn the mapping from its own clustering strategy to that of DIS 502. These prediction models can be either: 1.) exported for diagnostics and manual improvement of the clustering schemes on DLA 400 or 2.) used to validate the clustering performed by DLA 400 and potentially override it if its performance is too low.

In another embodiment, a classifier is trained based on the labels obtained from DIS 502. This classifier may predict the cluster of a particular host based data available locally at DLA 400 (e.g., application breakdowns, DPI from specific protocols, etc.). The classifier can then serve as a complement or a replacement for the base clustering strategy. Typically, the latter may be used during startup of the system and then replaced by the dynamically trained classifier once its performance is sufficiently high.

In another embodiment, as shown in FIG. 8A, DIS 502 may send feedback to DLA 400 via a custom unsolicited_cluster_reply( ) message 802 when DIS 502 detects a host profile change or otherwise determines that its clustering output would change. In such a case, both DLA 400 and DIS 502 may perform clustering continuously and in parallel, allowing the devices to provide feedback to one another. In some cases, DIS 502 may send unsolicited_cluster_reply( ) message 802, in accordance with configured criteria of a profile update policy (e.g., if a new attribute is discovered, etc.).

Many hosts in a network may be observed by several different DLAs (e.g. corporate DNS and HTTP servers). The information gathered through a clustering request/reply exchange can therefore benefit several DLAs beside the DLA which initiated the exchange. Since the DLAs use the same clustering criteria, it is likely that, if a host from one particular cluster have been inaccurately classified by one DLA, it will be probably be misclassified by other DLAs as well. Therefore, in another embodiment as shown in FIG. 8B, after receiving cluster_reply( ) message 704, DLA 400 can reply with a DLA_cluster_feeback( ) message 804 (e.g., to the central clustering device, such as the device hosting DIS 502). This message may include a list specifying the IP addresses that had been misclassified by DLA 400.

Upon reception of the list of misclassifications, the centralized controller may contact a topology service (e.g., which can be hosted on a central controller) and check if the misclassified addresses can be potentially observed by more than one DLA. If this is the case, the DLA controller may 1.) select the set of DLAs which are potentially affected by the same clustering error and 2.) send an unsolicited_cluster_reply( ) message 802 including the right clustering for the misclassified addresses. This allows the classification performed by the DLAs to be rectified where the hosts did not fulfill the requirements for triggering the verification. In addition, it avoids a flash crowd effect whereby profiling of the same hosts is requested by a large number of DLAs at the same time.

In another embodiment, DLA 400 or the supervisory controller (e.g., the SCA) can use the feedback model to check whether a classification error happens systematically on hosts belonging to the same cluster. In that case, the controller can proactively push the list of hosts belonging to such a cluster to all of the DLAs (or a chosen subset).

Using a Deep Learning Classifier for Device Profiling

A further approach to forming device clusters may leverage a centrally trained classifier, which would predict the right cluster of a given host. Such a supervised approach would leverage the DIS information in order to provide reliable labels for the IPs dataset which will be used in order to train the classifier. The supervised model (based on Deep Learning networks) would then be dispatched on remote learning agents.

The techniques herein further introduce a classifier-based, device profiling mechanism that combines a rich set of labels (e.g., a device profile) from an external DIS and determines a rich set of attributes for the labels. This information is then combined with traffic characteristics of the devices collected from remote DLA, to compute an efficient machine learning classifier for device profiling. In some aspects, a first request is sent by a DLA not capable of classifying a device. The request is processed by a central agent/supervisory device (e.g., an SCA) and redirected to a DIS. In turn, the DIS retrieves attributes for the profile, combines it with traffic related features after retrieving packet traces from the DLA, and computes a Deep Neural Network-based classifier that is then used by the DLA to detect anomalies.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, deep learning now permits accurate and reliable classification of very complex and structured objects, such as images, sounds, or documents. This is achieved by the learning of intermediate representations of at increasingly high abstraction levels, which are then combined to identify complex concepts from a set of seemingly disparate quantities. As such, deep learning is well suited to the task of device profiling, as it is allows to take a vast number of features constructed from the sheer number of data obtained from the above discovery processes, and use them very efficiently to recognize the type of device.

Figure 9A:
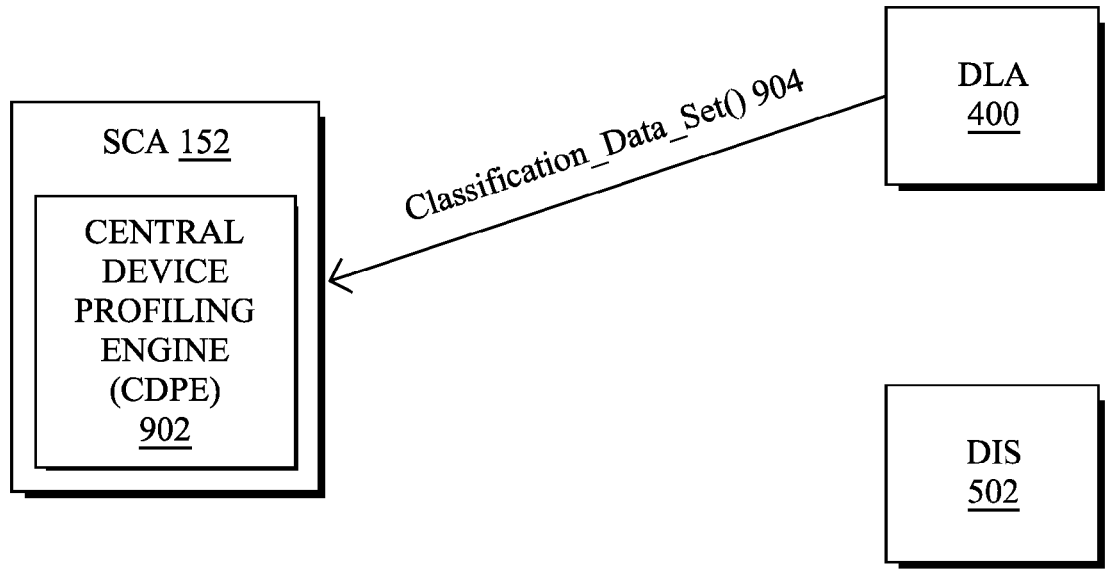
FIGS. 9A-9D illustrate examples of a behavioral model being trained using DIS information.

FIGS. 9A-9D illustrate examples of a behavioral model being trained using DIS information, according to various embodiments. One aspect of the techniques herein introduces a central device profiling engine (CDPE) 902 that may reside on a central controller, such as SCA 152 in the LSN, as shown in FIG. 9A. The role of CDPE 902 is to aggregate a number of sources of data in order to compute a machine learning based classifier that is then used at the edge (e.g., by a DLA 400), to classify devices and perform appropriate modeling for the devices in such clusters. CDPE 902 may communicate with the following components in the network:

DIS 502, to retrieve a rich set of profile-based information for a set of device type.

DLA 400 in order to 1.) identify the device type of interest for which the classifier must be trained and 2.) retrieve raw traffic related to such device types to train the classifier.

A key function of CDPE 902 is to use supervised learning to train a classifier that will be installed on the edge DLAs. Such a classifier will take as input a set of features based on the traffic observed by the hosting DLA, which may include both flow-level and DPI information. In turn, the model may provide as output the group to which the IP address should be attributed.

In a very simple example, when having to classify IP x, the classifier could take as input the bandwidth percentages of the different applications that IP x is associated with and return as classification output "DNS server." In one embodiment, the system can be bootstrapped with a classifier computed offline. In another embodiment, during the bootstrap period, no classifier is installed and CDPE 902 simply collects data from all of the DLAs under its management.

In greater detail, each of the DLAs (e.g., DLA 400) may send a custom classification_data_set( ) message 904 to CDPE 902 reporting a list of observed IPs and, for each of the IPs, a list of its relevant features (e.g., DPI-based and/or flow-based). In order to reduce the amount of bandwidth required by data collection, several strategies may be used. In one embodiment, the DLAs can perform random sampling and include in the message only randomly selected IPs. In another embodiment, the DLAs can select the IPs in order to achieve the maximum possible coverage of the feature space. This can be done by first identifying L2 switches located in key areas that see large subnets and then obtaining the information from these switches. In yet another embodiment, CDPE 902 can send a compressed list of addresses for which data are already available, to prevent the DLAs from sending further information concerning them (e.g., using a Bloom filter to compress the information).

Figure 9B:
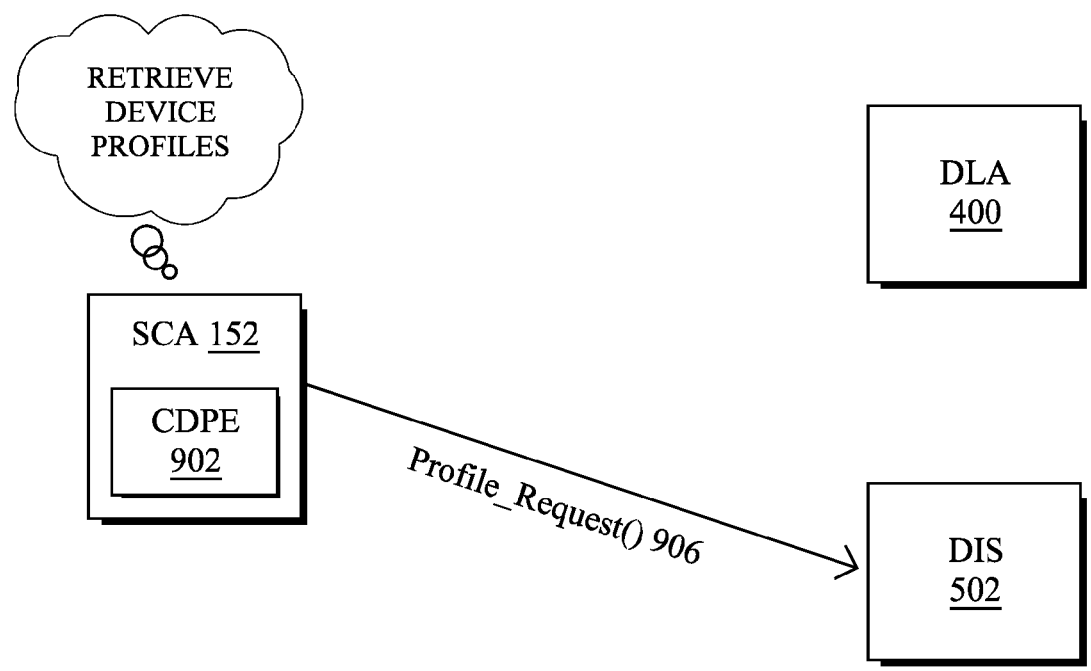
Figure 9C:
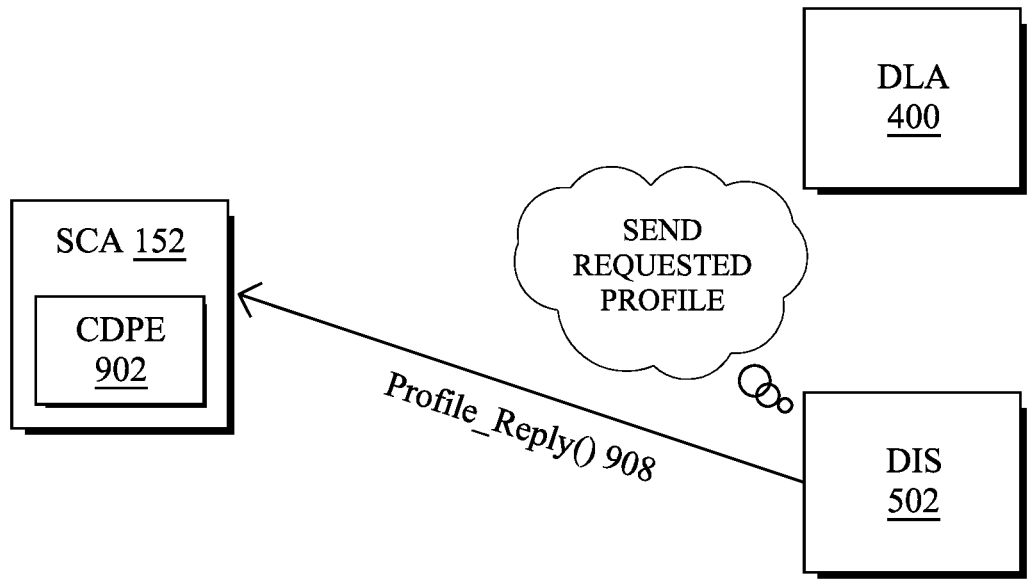

As shown in FIG. 9B, for each new IP, CDPE 902 may issue a profile_request( ) message 906 to DIS 502, which will be used in order to create a label for the data sample provided by DLA 400. In some embodiments, DIS 502 and CDPE 902 may be co-hosted on the same device. In other embodiments, DIS 502 and CDPE 902 may be hosted on separate devices. The key is to rely on DLA 400 to gather a wide range of data and DIS 502 to provide the labels corresponding to device classification. In response to receiving profile_request( ) message 906, DIS 502 may response with a corresponding profile_reply message 908 that includes the requested device profile information, as shown in FIG. 9C. Once a large enough dataset for training the classifier has been collected, CDPE 902 may perform the training and compute the classifier to be installed on the DLAs.

Figure 9D:
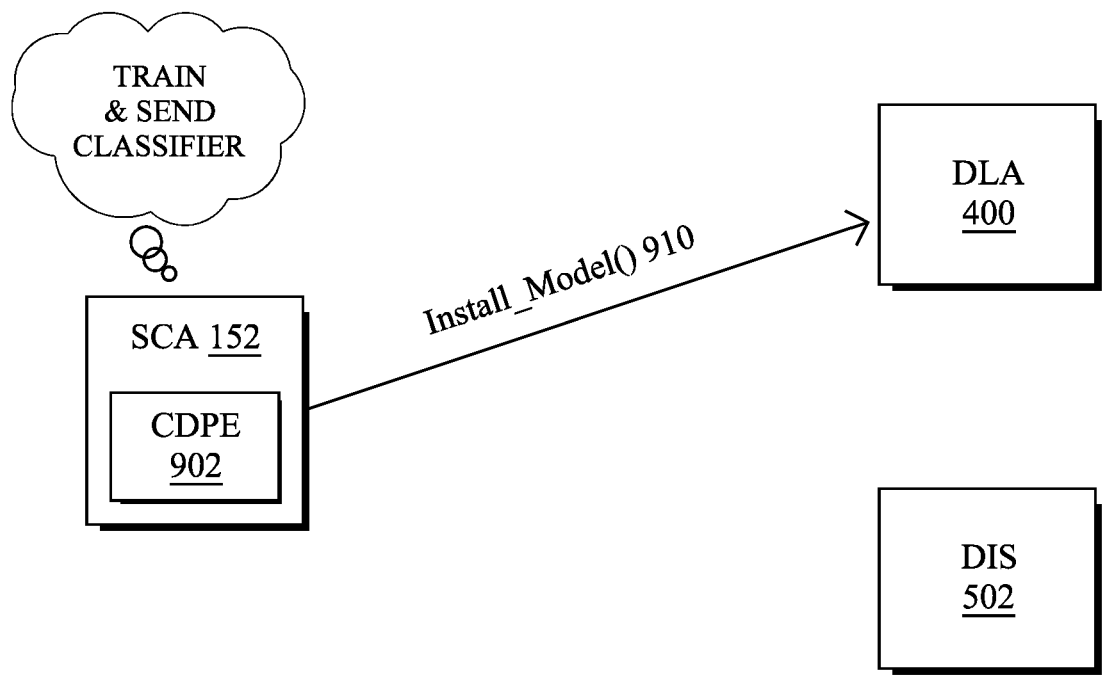

Notice that, as with any supervised learning tool, the classifier may yield possibly unreliable results for input data that are not represented in its training dataset. Furthermore, a classifier does not allow distinguishing whether an input sample belongs to a "never seen before" class. In order to prevent the assignment of newly observed host types to the known application types, CDPE 902 may also compute a "safeguard model," which describes the areas of the feature space that are indeed represented in the training set. These models are also known as density estimation models, and they come in many different forms (e.g., Kernel Methods, Histograms, One-class SVM, Mixture Models). As shown in FIG. 9D, SCA 152 may install both computed models on DLA 400 by sending an install_model( ) message 910 that includes the model details.

FIGS. 10A-10D illustrate examples of a model update using DIS information, according to various embodiments. Once the above bootstrapping phase is over, the system may enter its steady state. However, CDPE 902 may again activate when a new type of host is detected which is not part of the original training set, or additional data of interest can be gathered in order to improve the success rate of classification when needed. In this case the system may behave as detailed below.

Figure 10A:
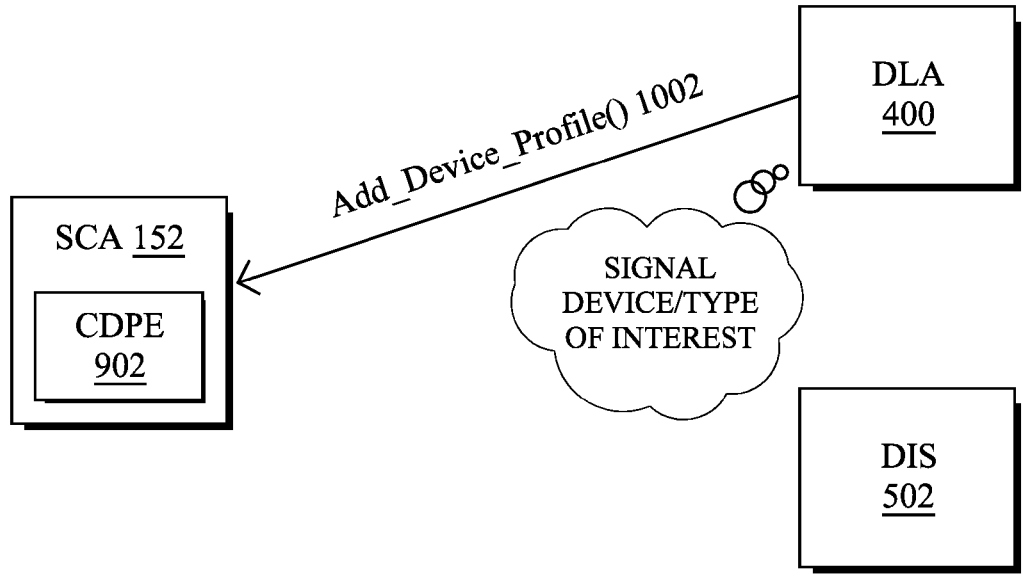
FIGS. 10A-10D illustrate examples of a model update using DIS information.
Figure 10B:
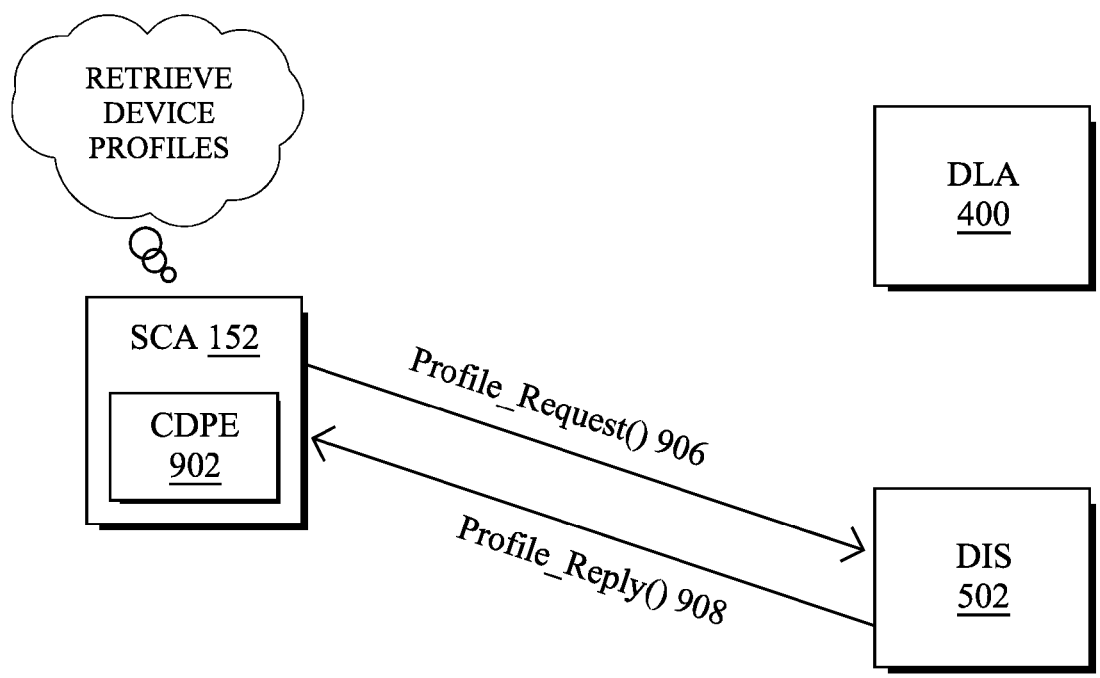

First, DLA 400 may send a custom add_device_profile( ) message 1002 to CDPE 902, to signal to CDPE 902 the list of devices and/or device types that are of interest, as shown in FIG. 10A. As shown in FIG. 10B, in response to receiving message 1002, CDPE 902 may send a new profile_request( ) message 906 to DIS 502 to retrieve the profile characteristics for the devices or device types in message 1002.

In response to receiving profile_request( ) message 906, if the IP address is specified but not the device profile name, DIS 502 may perform a lookup to find the corresponding device profile. After retrieving the profile, DIS 502 may return the profile information to CDPE 902 via a profile_reply( ) message 908. As pointed out, message 908 may include a variety of device attributes such as the product-name, device-name, OS-version, location, MAC address, AD name, historical behaviors, etc.

At this point, CDPE 902 knows the address of interest (IP and/or MAC address), the corresponding device profile name (e.g. Windows-Machine, etc.) and a set of rich attributes $<A_1, A_2, \ldots, A_n>$ provided by DIS 502. For each device profile attribute, CDPE 902 may use a mapping function to match the profile attributes with the features used by the machine learning. Such features vector are called $<f_1, f_2, \ldots, f_m>$ and are used to train the Deep Neural Network or, in general, a classifier. Note that n may have a different value than m, since profile attributes may or may not translate into features used by the classifier.

Figure 10C:
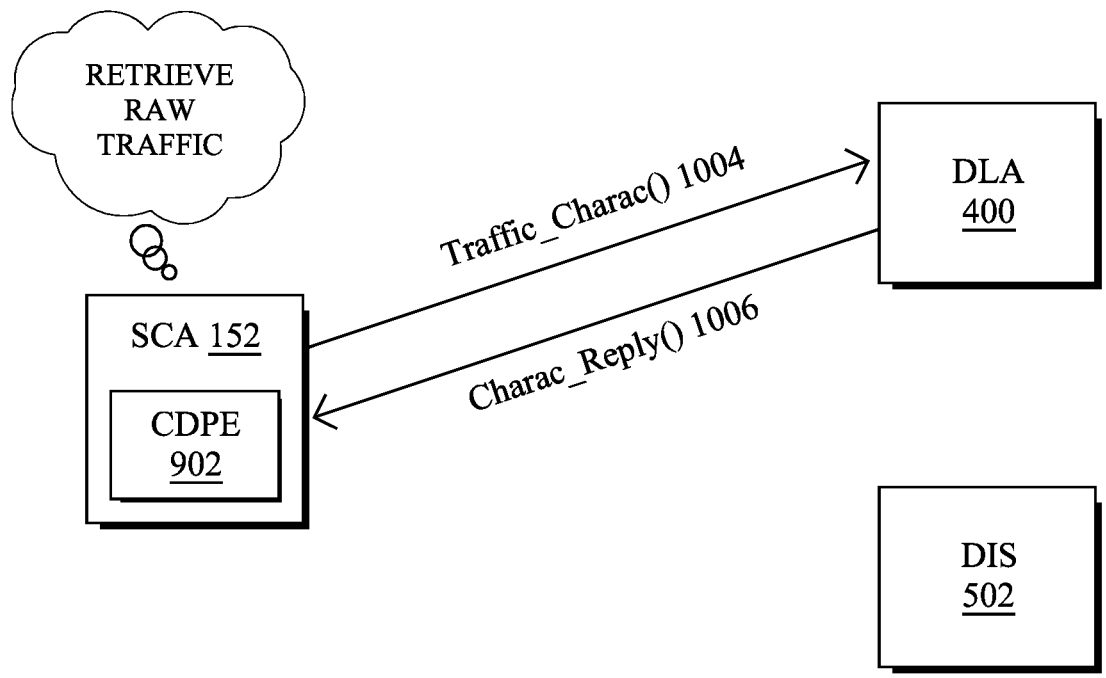

Then, CDPE 902 may map each feature onto a traffic characteristic map $<T_1, T_2, \ldots, T_j>$ that is encoded into an extended access control list (ACL) sent to DLA 400, to potentially retrieve raw packets matching the set of criterion. Doing so allows CDPE 902 to perform/improve the training of the classifier. To that end, as shown in FIG. 10C, CDPE 902 may send a custom traffic_charac( ) message 1004 to DLA 400 to request the raw traffic (e.g., raw packets) captured by DLA 400. In turn, DLA 400 may send a charac_reply( ) message 1006 back to CDPE 902 that includes the requested packets/captured traffic. In another embodiment, DLA 400 can provide a list of features to CDPE 902 as specified in the classification_data_set( ) message 904 which is used during the bootstrapping phase.

In one embodiment the access list includes only the IP address of the device originally listed in the profile_reply( ) message 908. In another embodiment, CPDE 902 may broaden the scope of the request. If DLA 400 requests an update of the classifier to now classify a device type that is not yet recognized, CPDE 902 may decide to request packet captures from all devices that match criteria in order to increase the robustness of the classifier. For example, suppose that DLA 400 requests a new classifier to recognize a new device profile corresponding to a specific device A. Upon retrieving the device attributes corresponding to A, CDPE 902 may request input data captures related to all devices matching the criterion and not just the device A. In another embodiment, CPDE 902 may extend its collection of packet traces to a set of DLAs, again with the objective of increasing the classifier robustness.

CDPE 902 may use any number of different techniques to train a Deep Neural Network. For example, CDPE 902 may train such a model by (1.) applying unsupervised pre-training followed by supervised training based on gradient descent or (2.) directly use gradient descent with Rectifier Linear Units (ReLU) as an activation function instead of the logistic sigmoid. Different approaches (e.g., Stacked Denoising Auto-encoders, Deep Boltzmann Machines, Deep Belief Networks, etc.) may require different training methods.

Figure 10D:
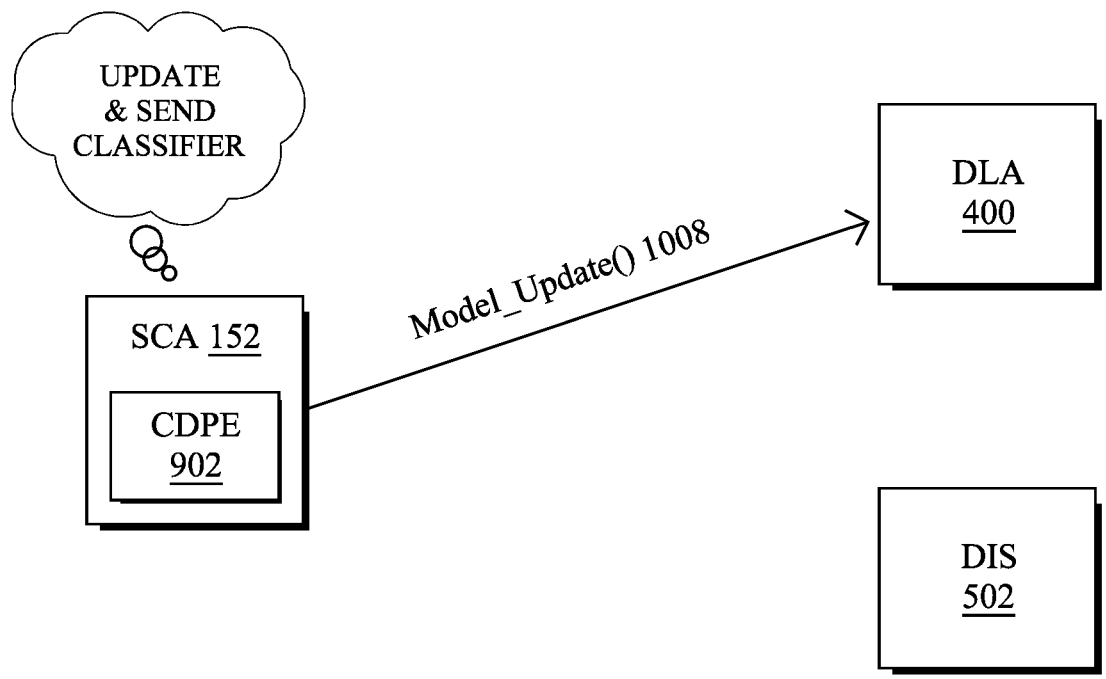

As shown in FIG. 10D, once CDPE 902 has trained the classifier, it is then uploaded to DLA 400 via a model_update( ) message 1008 and used by DLA 400 to perform classification and clustering. To this end, the features $<f_1, f_2, \ldots, f_m>$ that were initially used to train the classifier may be needed. As a result, all these features must be computable from data sources that are available at the edge (e.g., at DLA 400), such as Netflow or DPI.

For exemplary purposes only, suppose that DLA 400 needs to be able to efficiently classify (cluster) a new device A that has a profile that has not yet been encoded into the classifier (e.g., the class returned by the local ANN is unknown). In such a case, DLA 400 may first send a request to CDPE 902, which sends a request to DIS 502 to retrieve the attributes of A's profile. DIS 502 makes an IP lookup, and retrieves a set of attributes for the corresponding profiles. The number of attributes may be significant and may include, for example, the MAC address (OUI) from Radius, operating system, common ports, SNMP data from NMAP, device type (e.g., IP phone, camera, appliances, . . . ), FQDN from DNS probes, operating system from HTTP, mission critical application characterized by specific traffic behavior thanks to Netflow probes, or the like. If, for example, A is an IP phone that is characterized by a specific traffic profile, CPDE 902 may generate a template corresponding to the traffic of interest (all IP phones). The traffic characteristics of interest is then sent to DLA400 to receive packet captures used to train the classifier to better recognize the type of IP phone. Such a scenario shows that the proposed mechanism outperforms any existing approach for device classification.

In this case, although the number of attributes for each profile is large, the number of features is likely to be smaller and the traffic characteristics even smaller. In yet another example, if the device corresponds to a new type of printer, one of the attributes may correspond to a printer supplier characterized by its MAC address. Such MAC address format (used as a key feature in the machine learning classifier) is then passed by CDPE 902 to the DLAs so as to gather all traffic originated by all printers from that supplier. The rate at which packet captures gathering takes place may be governed by measuring the overall performance of remote classifiers. CDPE 902 may request more (or less) packet captures according to the ability of the remote classifier to detect a known class. Misclassification may not be detected, but explicit inability to classify (class is unknown) can be measured.

Figure 11:
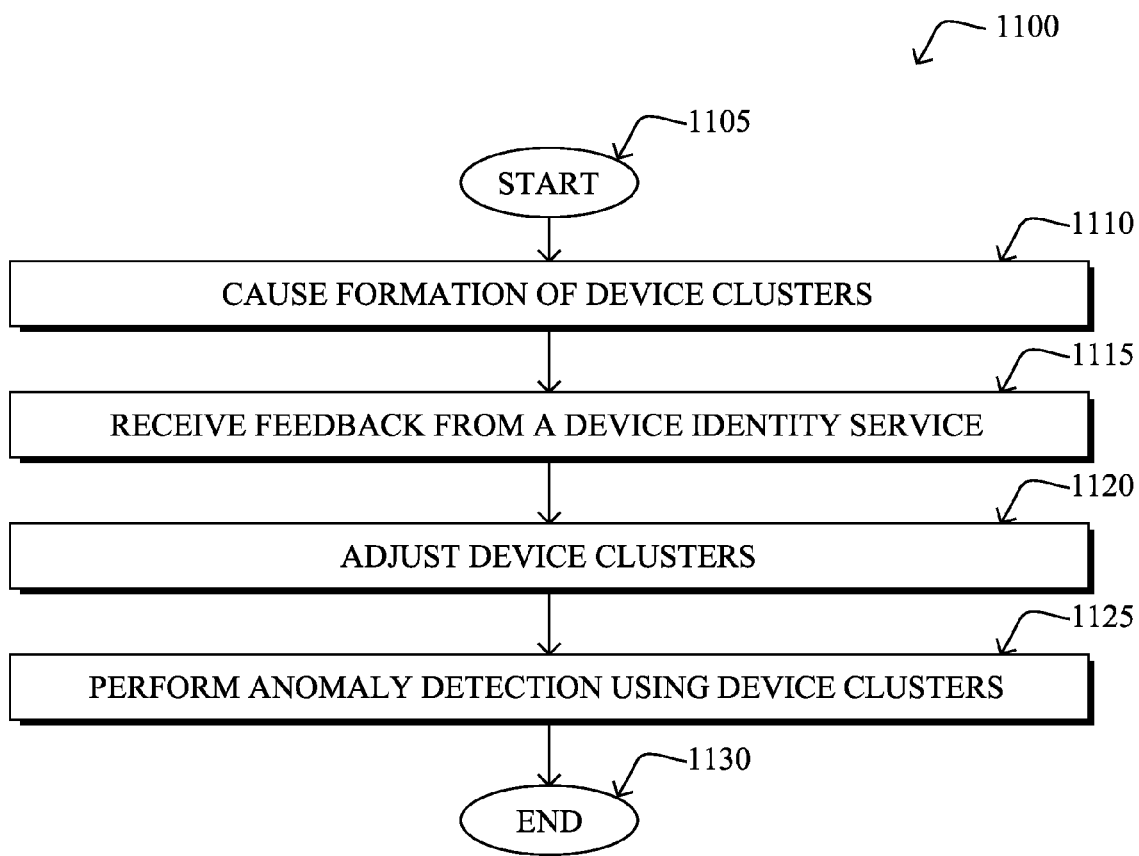
FIG. 11 illustrates an example simplified procedure for forming and using device clusters.

Referring now to FIG. 11, an example simplified procedure for forming and using device clusters is shown, in accordance with embodiments herein. Procedure 1100 may be performed, for example, by a specialized networking device such as a router or the like by executing stored instructions (e.g., SLA process 248). Procedure 1100 starts at step 1105 and continues on to step 1110 where, as described in greater detail above, the networking device may cause the formation of device clusters. In general, the members of the device clusters may exhibit similar behaviors and/or other characteristics. In some embodiments, the networking device may compute the clusters locally and using local information. For example, if the device is a router at the edge of the network, the router may capture traffic information regarding the applications associated with the traffic of the devices (e.g., using Netflow records, DPI, etc.). In other embodiments, the networking device may request that another device calculate the clusters. For example, the networking device may request that the host of a DIS form the clusters using DIS-supplied device profile information. As would be appreciated, the DIS may have a richer set of device attribute information (e.g., by performing various probing of the nodes/devices, etc.).

At step 1115, as detailed above, the networking device may receive feedback from the DIS regarding the formed device clusters. In various embodiments, the feedback may be based on the DIS performing probing of the clustered devices. In some cases, the DIS may provide feedback to notify the networking device that the device profile of a cluster member changes, if a new device joins the network, or under any other circumstance that may affect how the devices are clustered. In some embodiments, both the networking device and the DIS may separately compute device clusters. In such cases, the feedback may comprise the clusters formed by the DIS, providing a contrast between the clusters formed using local information of the networking device (e.g., DPI-based information, etc.) and the clusters formed using the device profile information gathered by the DIS.

At step 1120, the networking device may adjust its device clusters based on the feedback, as described in greater detail above. In some embodiments, if the feedback includes clusters computed by the DIS or otherwise based on the DIS profile information, the networking device may override its locally computed clusters with the clusters based on the DIS profiles. In further embodiments, the networking device may report any discrepancies between the two sets of clusters to the DIS or another supervisory device, allowing the supervisory device to adjust the clusters of other DLAs in the SLN.

At step 1125, as detailed above, the networking device may perform anomaly detection using the adjusted device clusters. In some embodiments, the device may model the behavior of the members of a specific device cluster, to identify anomalous behavior by any one of the member devices. In further embodiments, the device may model cluster interactions and use the models to detect anomalous behaviors between the clusters. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a learning agent to determine improper classification (clustering) thanks to requests to a device-profiling engine such as an DIS, thus greatly enhancing the quality of clustering and consequently modeling of such devices. The techniques further significantly improve classification and device profiling at the edge of the network leading to better clustering and modeling with a high degree of granularity and flexibility, by aggregating data from various sources.

While illustrative embodiments that provide for anomaly detection in a network are shown and described herein, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
causing, by a networking device in a network, formation of device clusters of devices in the network, wherein the devices in a particular cluster exhibit similar behavioral characteristics learned by at least one learning agent in the network;
receiving, at the networking device, feedback from a device identity service regarding the device clusters, wherein the feedback is based in part on the device identity service probing the devices;
dynamically adjusting, by the networking device, the device clusters based on the feedback from the device identity service; and
performing, by the networking device, anomaly detection in the network using the adjusted device clusters by modeling behavior of devices in a specific adjusted device cluster.

2. The method as in claim 1, wherein causing the formation of the device clusters comprises:
receiving, at the networking device, device profile information from the device identity service; and
clustering, by the networking device, the devices based in part on the received device profile information.

3. The method as in claim 2, further comprising:
requesting, by the networking device, the device profile information from the device identity service for a particular one of the devices, based on one or more of: an amount of time since the particular device was last active on the network, an application or protocol used by the particular device, an anomaly score associated with the particular device, or a stability metric for a profile of the particular device.

4. The method as in claim 1, wherein causing the formation of the device clusters comprises:
sending, by the networking device, a clustering request to the device identity service; and
receiving, at the networking device, the formed device clusters from the device identity service, in response to sending the clustering request.

5. The method as in claim 1, wherein the device clusters are formed locally by the networking device, wherein the feedback from the device identity service comprises a set of device clusters formed by the device identity service, and wherein adjusting the device clusters based on the feedback from the device identity service comprises:
comparing, by the networking device, the set of device clusters formed by the device identity service with the device clusters formed locally by the networking device.

6. The method as in claim 5, further comprising:
using a trained classifier or prediction model to compare the set of device clusters formed by the device identity service with the device clusters formed locally by the networking device.

7. The method as in claim 1, wherein the feedback from the device identity service identifies one or more of devices as having been incorrectly clustered.

8. The method as in claim 1, wherein the device identity service performs network admission control for the devices.

9. The method as in claim 1, wherein performing anomaly detection in the network using the adjusted device clusters comprises:
receiving, at the networking device and from a supervisory device, an anomaly detection model, wherein the supervisory device trained the anomaly detection model using device profile information for the devices and maintained by the device identity service.

10. The method as in claim 1, wherein the networking device is a router located at an edge of the network.

11. An apparatus, comprising:
one or more network interfaces to communicate with a network;
a processor coupled to the network interfaces and configured to execute one or more processes; and
a memory configured to store a process executable by the processor, the process when executed operable to:
cause formation of device clusters of devices in the network, wherein the devices in a particular cluster exhibit similar behavioral characteristics learned by at least one learning agent in the network;
receive feedback from a device identity service regarding the device clusters, wherein the feedback is based in part on the device identity service probing the devices;
dynamically adjust the device clusters based on the feedback from the device identity service; and
perform anomaly detection in the network using the adjusted device clusters by modeling behavior of devices in a specific adjusted device cluster.

12. The apparatus as in claim 11, wherein the apparatus causes the formation of the device clusters by:
receiving device profile information from the device identity service; and
clustering the devices based in part on the received device profile information.

13. The apparatus as in claim 12, wherein the process when executed is further operable to:
request the device profile information from the device identity service for a particular one of the devices based on one or more of: an amount of time since the particular device was last active on the network, an application or protocol used by the particular device, an anomaly score associated with the particular device, or a stability metric for a profile of the particular device.

14. The apparatus as in claim 11, wherein the apparatus causes the formation of the device clusters by:
   sending a clustering request to the device identity service; and
   receiving the formed device clusters from the device identity service, in response to sending the clustering request.

15. The apparatus as in claim 11, wherein the apparatus is a router at an edge of the network.

16. The apparatus as in claim 15, wherein the device clusters are formed locally by the router, wherein the feedback from the device identity service comprises a set of device clusters formed by the device identity service, and wherein the apparatus adjusts the device clusters based on the feedback from the device identity service by comparing the set of device clusters formed by the device identity service with the device clusters formed locally by the router.

17. The apparatus as in claim 16, wherein the process when executed is further operable to use a trained classifier or prediction model to compare the set of device clusters formed by the device identity service with the device clusters formed locally by the router.

18. The apparatus as in claim 11, wherein the process when executed is further operable to:
   receive, from a supervisory device, an anomaly detection model, wherein the supervisory device trained the anomaly detection model using device profile information for the devices and maintained by the device identity service.

19. The apparatus as in claim 11, wherein the device identity service performs network admission control for the devices.

20. A tangible, non-transitory, computer-readable media having software encoded thereon, the software when executed by a processor of a networking device in a network configured to:
   cause formation of device clusters of devices in the network, wherein the devices in a particular cluster exhibit similar behavioral characteristics learned by at least one learning agent in the network;
   receive feedback from a device identity service regarding the device clusters, wherein the feedback is based in part on the device identity service probing the devices;
   dynamically adjust the device clusters based on the feedback from the device identity service; and
   perform anomaly detection in the network using the adjusted device clusters by modeling behavior of devices in a specific adjusted device cluster.

* * * * *

UNITED STATES PATENT AND TRADEMARK OFFICE
CERTIFICATE OF CORRECTION

PATENT NO. : 10,218,726 B2
APPLICATION NO. : 15/180540
DATED : February 26, 2019
INVENTOR(S) : Jean-Philippe Vasseur et al.

It is certified that error appears in the above-identified patent and that said Letters Patent is hereby corrected as shown below:

In the Specification

Column 6, Line 48, please amend as shown:
VPN" <draft-ietf-l2vpn-evpn>, introduce a solution for mul- Signed and Sealed this
Twenty-sixth Day of May, 2020

Andrei Iancu
*Director of the United States Patent and Trademark Office*